US012481247B2

(12) United States Patent
Calabrese

(10) Patent No.: US 12,481,247 B2
(45) Date of Patent: Nov. 25, 2025

(54) TIMEPIECE MOVEMENT ESCAPEMENT, RETURN COMPONENT FOR TIMEPIECE ESCAPEMENTS, TIMEPIECE MOVEMENT AND TIMEPIECE COMPRISING SUCH A MOVEMENT

(71) Applicant: Vincent Calabrese, Morges Vaud (CH)

(72) Inventor: Vincent Calabrese, Morges Vaud (CH)

( * ) Notice: Subject to any disclaimer, the term of this patent is extended or adjusted under 35 U.S.C. 154(b) by 344 days.

(21) Appl. No.: 18/043,642

(22) PCT Filed: Aug. 10, 2021

(86) PCT No.: PCT/EP2021/072227
§ 371 (c)(1),
(2) Date: Mar. 1, 2023

(87) PCT Pub. No.: WO2022/048864
PCT Pub. Date: Mar. 10, 2022

(65) Prior Publication Data

US 2023/0324851 A1 Oct. 12, 2023

(30) Foreign Application Priority Data

Sep. 3, 2020 (CH) ....................................... 1090/20

(51) Int. Cl.
*G04B 17/04* (2006.01)
*G04B 15/08* (2006.01)
(Continued)

(52) U.S. Cl.
CPC ........... *G04B 17/045* (2013.01); *G04B 15/08* (2013.01); *G04B 15/14* (2013.01); *G04B 18/04* (2013.01)

(58) Field of Classification Search
CPC ...... G04B 17/045; G04B 15/08; G04B 15/14; G04B 18/04; G04B 15/06
See application file for complete search history.

(56) References Cited

U.S. PATENT DOCUMENTS 8,801,268 B2 * 8/2014 Uchiyama .............. G04B 15/06 368/127
9,075,394 B2 * 7/2015 Stranczl ................. G04B 15/06
(Continued)

FOREIGN PATENT DOCUMENTS

CH 19698 A 9/1900
CH 34983 A 6/1906
WO WO-2015/010797 A1 1/2015

OTHER PUBLICATIONS

International Search Report for International Application No. PCT/EP2021/072227 dated Nov. 9, 2021.

*Primary Examiner* — Edwin A. Leon
(74) *Attorney, Agent, or Firm* — Harness, Dickey & Pierce, P.L.C.

(57) ABSTRACT

A return member for a balance wheel of a timepiece, replacing a spiral spring. This return member includes a rake provided with a toothed sector arranged to work together with a balance wheel pinion. The rake has an axis of rotation allowing it to move between two extreme positions, called working positions, separated by a rest position. The return member also has two springs arranged to press the rake towards its rest position. Each spring is made up of an elastic blade arranged to store energy, then to return it to the rake. Each elastic blade works alternately so that they never work simultaneously. The return member may be in an escapement, a clockwork movement or a timepiece comprising such a movement.

15 Claims, 5 Drawing Sheets

(51) Int. Cl.
*G04B 15/14* (2006.01)
*G04B 18/04* (2006.01)

(56) References Cited

U.S. PATENT DOCUMENTS

| | | | | |
|---|---|---|---|---|
| 11,650,544 | B2 * | 5/2023 | Musy | G04B 17/32<br>368/131 |
| 2013/0176829 | A1 * | 7/2013 | Cusin | G04B 15/00<br>368/127 |
| 2016/0179058 | A1 * | 6/2016 | Born | G04C 3/008<br>368/167 |

* cited by examiner

TIMEPIECE MOVEMENT ESCAPEMENT, RETURN COMPONENT FOR TIMEPIECE ESCAPEMENTS, TIMEPIECE MOVEMENT AND TIMEPIECE COMPRISING SUCH A MOVEMENT

CROSS-REFERENCE TO RELATED APPLICATIONS

This application is a national phase under 35 U.S.C. § 371 of PCT International Application No. PCT/EP2021/072227 which has an International filing date of Aug. 10, 2021, which claims priority to Swiss Application No. 01090/20, filed Sep. 3, 2020, the entire contents of each of which are hereby incorporated by reference.

TECHNICAL FIELD

The present invention relates to the field of horology and in particular of portable mechanical horology. Its subject-matter is the replacement of the spiral spring as a return member of the balance wheel by a component which is simpler to manufacture, which does not have the defects of the hairspring and which can be adapted to the existing escapement systems for portable horology devices.

More particularly, the present invention relates to a clockwork movement escapement, comprising a balance wheel, an escape wheel, a lever and a balance wheel return member. It also relates to a return member for a timepiece movement comprising an escapement provided with a balance wheel, with an escape wheel and with a lever.

The invention also relates to a timepiece movement comprising an escapement provided with a balance wheel, with an escape wheel, with a lever and with a balance wheel return member.

Finally, this invention relates to a timepiece comprising a movement, an escapement or a return member as defined above.

PRIOR ART

Fixed horology devices, whether monumental, wall or table ones, have provided sufficient precision for centuries thanks to the invention of the pendulum. This precision of the pendulum is due to the force of gravity which acts on the return member to bring the pendulum back to its dead centre. The timepiece being fixed, it takes advantage of the force of gravity which is invariable.

The first tests for portable horology devices were carried out with a crown wheel escapement and the addition of a foliot as a return device. This system not being able to give satisfactory precision, a substantial improvement was obtained only after the invention of the spiral spring.

However, the spiral spring is by far not as satisfactory as the force of gravity and its performance is by far not invariable. In addition to its very delicate manufacture, the most important defect is its variation in the vertical position, as well as the variation of its couple between the contraction and the relaxation of turns, what in business terms is called ascending angle and descending angle. Despite all the research, in its form and in its material, a satisfactory solution to its disadvantages has not been found yet.

Therefore, despite all the research on escapements, even on balance wheels or other components, their arrangement and their functions, it has not been possible to overcome the constraint of the hairspring.

Several developments have sought to replace the spiral spring in a clockwork movement. Among these, Swiss patent No. 34983 can be cited. In this patent, the clockwork movement includes a toothed rake acting on a balance wheel pinion. The rake has a split rod and pivots on a shaft arranged at the end of the split rod opposite the teeth of the rake. The timepiece movement comprises an elastic blade fixed to a plate at one of its ends and provided with a lug near its other end. The lug is provided so as to slide in the slot of the split rod of the rake. This rake, the split rod and the elastic blade work together to form the balance wheel return member.

In this realisation, the elastic blade must be capable of storing energy when it is deformed by the motion of the rake. It must then return this energy to move the rake in the opposite direction, beyond the dead centre or the rest position of the rake. Maintenance of the movement and friction compensation is done by the cooperation between an impulse plane of the escape wheel and the pallets of the lever.

The realisation described in the aforementioned patent presents several problems. The elastic blade and the split rod are not in the same plane. The lug protrudes from the elastic blade so that it can be placed in the slot of the split rod. The motion of the lug in the slot generates a torsion of the elastic blade as well as friction, which involves significant energy losses.

Furthermore, the elastic blade must respond to two contradictory constraints. On the one hand, its stiffness must be great enough for a sufficient quantity of energy to be stored during its deformation under the effect of the motion of the balance wheel and released when the elastic blade returns towards its rest position. This amount of energy must also compensate for the losses related to the friction of the lug in the slot and to the torsion of the elastic blade.

On the other hand, the stiffness must be weak enough for the rake to be able to sufficiently move to allow an angular motion of the balance wheel of at least 300°.

An elastic blade which is too rigid would prevent a significant angular motion of the rake because this elastic blade would tend to bring this rake back to its dead centre as soon as it makes a relatively weak angular motion. An elastic blade which is not rigid enough would not allow to store enough energy to allow the balance wheel to continue its movement.

Moreover, if the elastic blade is too rigid, the movement cannot start. Indeed, the movement can start only if a pallet of the lever has reached an impulse plane of the escape wheel. This is not possible if the elastic blade is too rigid.

With the system as described in the aforementioned patent, an elastic blade which already exists or is made with existing materials and technologies would not allow to use the principles of the invention, its stiffness being too great to allow a sufficiently large motion of the balance wheel.

The stiffness of a spring depending in particular on its useful length, a solution allowing to reduce the stiffness of the elastic blade could be to lengthen it. A typical spiral spring has between 12 and 15 coils. In practice, a watch case such as a typical wristwatch does not make it possible to house an elastic blade long enough to obtain a functional return member.

The invention described in this patent CH 34983 tried to solve certain problems of the spiral springs by producing a symmetrical return member, which avoids the problems related to the asymmetry of the spiral springs. However, the result obtained cannot be used in a watch of the wristwatch type.

Swiss patent application No. 19698 also describes, in one of the embodiments, a rake acting on a balance wheel pinion. As in patent CH 34983 cited above, the rake is linked to an elastic rod, the deformation of which is supposed to allow the rotation of the balance wheel pinion.

The invention described in this patent has the same problems as those described in the aforementioned patent so that it is not possible to put this invention into practice.

With the aim of replacing the spiral spring and the disadvantages of the latter, it would be advantageous to find a solution to provide a balance wheel actuating member which is simpler to manufacture than the hairspring, which is symmetrical, which allows the start of the movement of the timepiece, the size of which is compatible with use in a wristwatch of conventional size and which does not have the disadvantages of the realisations of the inventions described in the prior art.

DESCRIPTION OF THE INVENTION

The disadvantages of the return members of prior art are eliminated by the return member of the present invention.

The aim of this invention is to provide a return member which reacts in the same way in both directions of motion of the balance wheel, which is not disturbed in the vertical positions and which is not as fragile and delicate in its handling as a spiral spring.

These aims are achieved by a clockwork movement escapement as defined in the preamble and characterized in that the balance wheel is integral with a balance wheel pinion, and in that the balance wheel return member comprises a rack provided with a toothed sector arranged to work together with the balance wheel pinion, this rake comprising an axis allowing its rotation between two extreme positions, called working positions, separated by a rest position; this return member further comprising a return mechanism comprising two springs arranged to press the rake towards its rest position.

The aims of the invention are also achieved by a return member as defined in the preamble and characterized in that it comprises a rake provided with a toothed sector arranged to work together with a balance wheel pinion, this rake comprising an axis allowing it to rotate between two extreme positions, called working positions, separated by a rest position; and two springs arranged to press the rake towards its rest position.

The aims of the invention are further achieved by a timepiece movement as defined in the preamble and characterized in that the balance wheel is integral with a balance wheel pinion, and in that the balance wheel return member comprises a rake provided with a toothed sector arranged to work together with the pinion of the balance wheel, this rake comprising an axis allowing it to rotate between two extreme positions, called working positions, separated by a rest position, this return member further comprising a return mechanism comprising two springs arranged to press the rake towards its rest position.

Finally, the aims of the invention are achieved by a timepiece comprising a movement, an escapement or a return member as defined above.

According to the invention, unlike the spiral spring, the return member is not fixed to the balance wheel and its connection with the balance wheel occurs by mechanical gearing.

This return member comprises a toothed part, hereinafter referred to as a rake, and a return mechanism comprising two springs made in the form of two elastic blades. The increase in friction due to the gearing between the rake and the pinion of the balance wheel is, according to the invention, compensated by the reduction in the disadvantages due to the spiral spring, its pinning up to the stud, its index-assembly as well as the defects described at the beginning of this disclosure.

The escapement of the invention comprises a rake provided with a toothed sector working together with a balance wheel pinion. It also comprises a return mechanism provided with two elastic blades. The rake pivots on its axis between two extreme positions, called working positions and corresponding to the maximum rotation of the balance wheel. These two extreme points are separated by a rest position.

When the rake is moved out of its rest position, one of the elastic blades is deformed by the rake. This deformation has the effect of allowing the elastic blade to store energy. This energy is then used by the elastic blade to press the rake towards its rest position. Due to the configuration of the escapement and in particular of the lever, the energy supplied to the rake allows it to go beyond its rest position. When it is beyond this rest position, the elastic blade which provided it with energy no longer interacts with the rake. The other elastic blade interacts in turn to store, then to return energy.

According to the invention, the return member has symmetry relative to a plane passing through an axis of rotation of the balance wheel. Because of this symmetry, the forces acting when the balance wheel moves in one direction of rotation are the same as those acting when the balance wheel moves in the other direction of rotation. One of the disadvantages due to the asymmetry of the hairspring is thus eliminated.

The return member of the invention is formed by a return mechanism comprising two springs made in the form of two elastic blades or spring blades acting on the rake. These elastic blades can be configured and placed in such a way that the rake can move slightly angularly before one of the elastic blades acts on it to bring it back to its rest position. This allows a start of the movement of the watch and avoids the problem of stopping on the rest plane. The fact of using two elastic blades independent of each other and never working simultaneously makes it possible to divide the stiffness of the return mechanism by two, which makes it possible to obtain blades of sufficiently short length to be able to be placed in a watch case of conventional size. This makes it possible to avoid in particular the problems of the return members described in patents CH 34983 and CH 19698.

In the return member of the invention, the two elastic strips are independent of each other. Therefore, when one of the blades is deformed so as to store energy or to return it, the other elastic blade is inactive and does not interact with the rake. This avoids problems related to elastic blades which are too rigid, which could arise in the case where two elastic blades act simultaneously on the rake.

The rake consists of a sector of a toothed wheel which could typically have between 80 and 160 teeth. Assuming that the balance wheel performs a movement with an amplitude of 330° and that the balance wheel has 10 teeth, the angular motion would be 37.125° for a rake corresponding to an 80-tooth wheel and 18.5625° for a rake corresponding to a 160-tooth wheel. The weak angular motion of the rake can be managed by the return mechanism while allowing a significant angular motion of the balance wheel.

BRIEF DESCRIPTION OF THE DRAWINGS

The invention and its advantages will be better understood with reference to the appended figures and to the detailed description of particular embodiments, in which.

EMBODIMENT OF THE INVENTION

Figure 1:
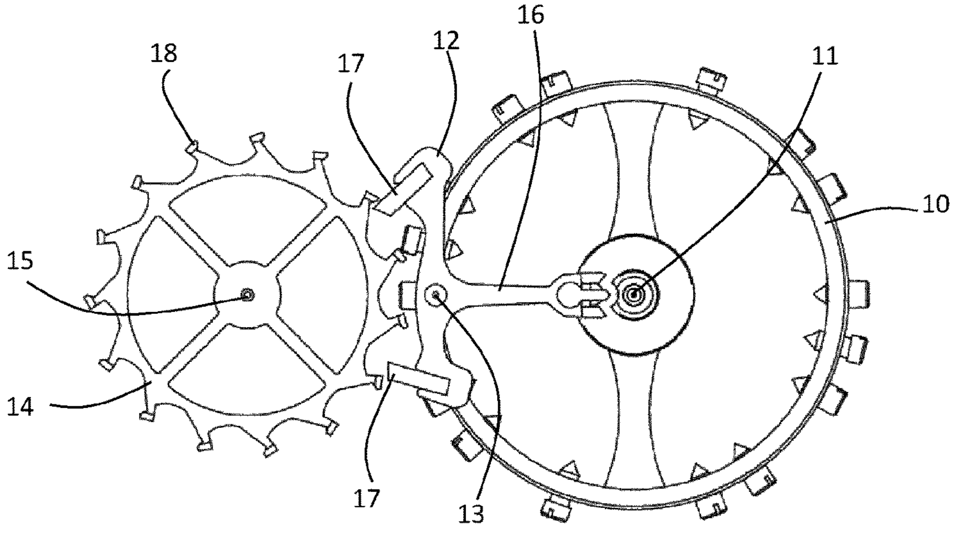
Fig. 1 PRIOR ART
FIG. 1 is a top view of a classic Swiss lever escapement, without hairspring.
Figure 2:
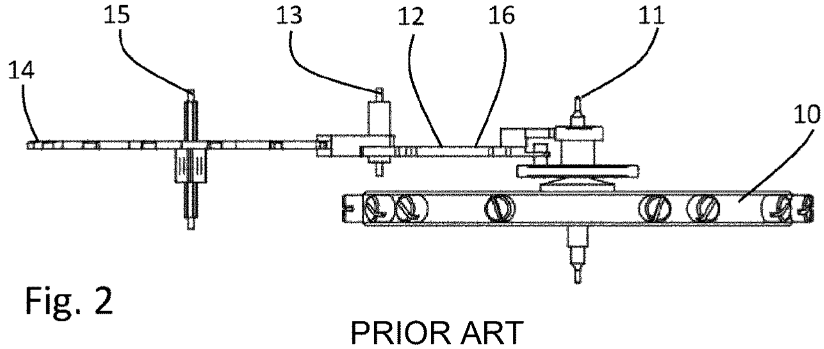
Fig. 2 PRIOR ART
FIG. 2 is a profile view of the escapement of FIG. 1.
Figure 3:
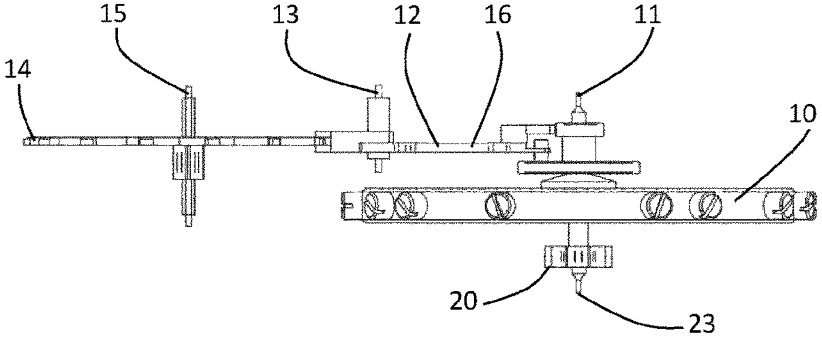
Fig. 3 PRIOR ART
FIG. 3 is a profile view of the escapement of FIGS. 1 and 2, comprising a balance wheel shaft fitted with a pinion.

The invention relates in particular to a clockwork movement escapement. In the illustrated embodiments, the escapement comprises a conventional part and a new part. The conventional part is represented in FIGS. 1 to 3 by a part of a Swiss lever escapement. This escapement comprises a balance wheel 10 pivoting on a balance wheel shaft 11, a lever 12 pivoting on a lever shaft 13 and an escape wheel 14 pivoting on an escape wheel shaft 15. The lever 12 also comprises in a conventional manner, in particular a fork 16 actuated by the balance wheel 10 and two pallets 17 acting on teeth 18 of the escape wheel 14. Unlike conventional escapements, this escapement does not comprise any spiral spring. It should be noted that the Swiss lever escapement has been represented here, this escapement being the most commonly used in practice. A return member according to the invention could however also be used on any other escapement in which a balance wheel acts as a regulating member.

The new part comprises a return member 19 replacing the spiral spring in its function.

The return device according to the invention can be integrated into an existing escapement or form part of an escapement specifically developed for this movement.

With particular reference to FIG. 3, the balance wheel 10 used in the present invention comprises a balance wheel pinion 20 integral with the balance wheel shaft 11.

The return member 19 according to the present invention comprises a rake 21 comprising a toothed sector 22 and one or two arms 23. The rake 21 pivots around an axis of the rake 24 integral with a plate (not represented) of the clockwork movement. This rake can move on either side of its rest position, between two extreme working positions, in which the balance wheel 10 has made a maximum motion, clockwise or anti-clockwise.

The return member 19 further comprises a return mechanism 25 comprising two springs 26, the operation of which is described below. These springs 26 consist of two elastic blades 27 in the illustrated embodiments.

Figure 4:
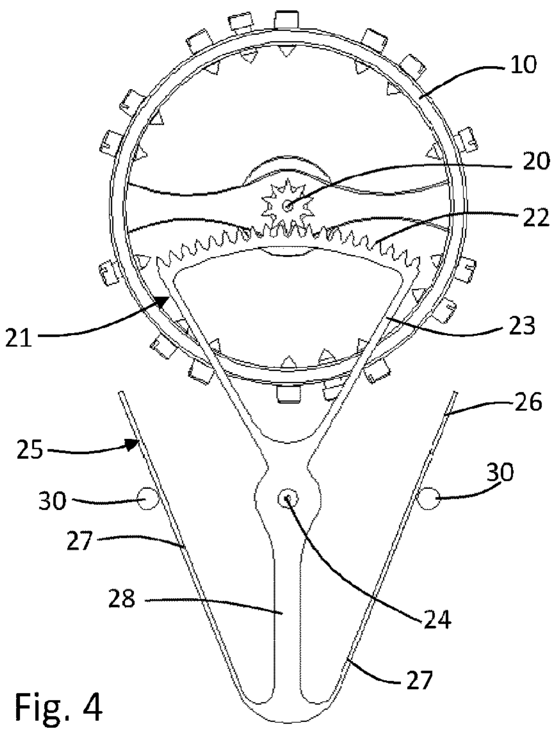
FIG. 4 is a top view of a part of the escapement of FIGS. 1 to 3, comprising a return member according to a first embodiment of the present invention, in a rest position.
Figure 5:
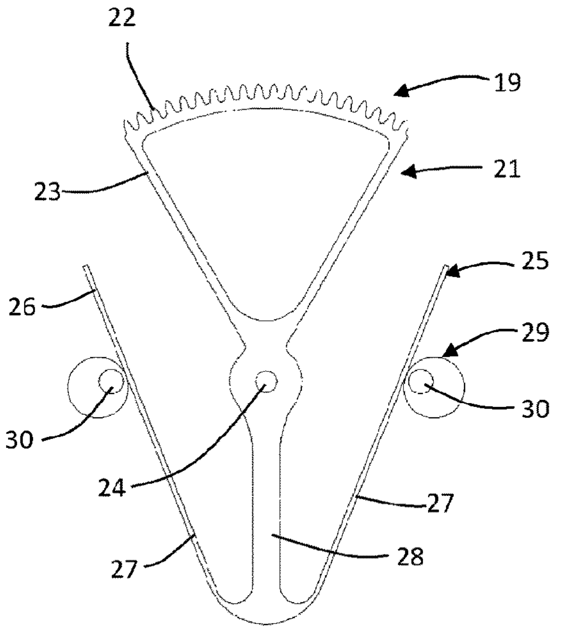
FIG. 5 illustrates the return member of FIG. 4, in a rest position.
Figure 6:
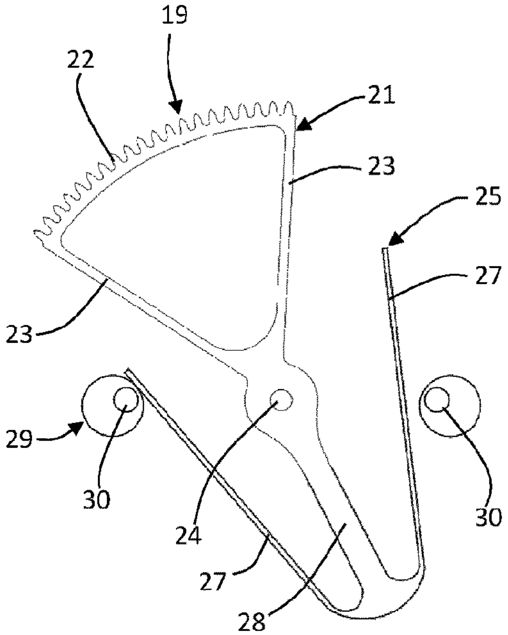
FIG. 6 illustrates the return member of FIG. 4, in a working position.

In the embodiment illustrated by FIGS. 4 to 6, the rake 21 comprises two arms 23, one end of which is arranged at each end of the toothed sector 22 and the other ends of which join near the axis 24 of rotation of the rake.

This rake 21 further comprises a rod 28 having one end close to the axis 24 of the rake and the other end integral with the elastic blades 27.

The return member 19 can be placed on a plate of a timepiece which has two pins 30 arranged so that the elastic blades 27 can lean against these pins depending on the position of the rack 21.

In this embodiment, the rake 21, the arms 23, the rod 28 and the elastic blades 27 are integral and are made in one piece.

FIGS. 4 and 5 illustrate the rake 21 in rest position. FIG. 6 illustrates the rake 21 in working position.

When the balance wheel 10 is pivoted in one direction, in a working position as illustrated for example by FIG. 6, the balance wheel pinion 20 acts on the toothed sector 22 of the rake 21 to cause the latter to pivot in the opposite direction, on its axis of rotation 24. This has the effect of deforming one of the elastic blades 27 against the corresponding pin 30 of the movement. This elastic blade 27 stores energy. The other elastic blade is free and does not interact with the rest of the movement, or with the other pin 30 so that it does not oppose the rotation of the rake 21 or of the balance wheel 10.

When the stress exerted by the elastic blade 27 is sufficient, after a certain angular motion of the rake 21 and therefore of the balance wheel 10, the blade returns energy and causes the rake to pivot in the other direction of rotation. This causes the rotation of the balance wheel via the balance wheel pinion 20. Conventionally, the balance wheel 10 acts on the lever 12 so as to release a tooth 18 of the escape wheel 14. An impulse plane of a tooth of the escape wheel 14 acts on one of the pallets 17 of the lever 12 so as to supply energy to this lever which transmits it to the balance wheel 10 via the fork 16. This energy is used by the balance wheel to pivot on its axis 11, which causes the rotation of the rake 21 on its axis 24 and makes it possible to load the other elastic blade 27 of the return mechanism 25.

This alternating movement is similar to the one generated by a hairspring. However, unlike the hairspring, the elastic blades 27 are symmetrical to each other when the rake is in rest position, which implies that there is no difference in operation when the balance wheel 10 pivots clockwise or counterclockwise.

The pins 30 can be mounted on an eccentric and thus form a regulating element 29. This eccentric makes it possible to modify the stiffness of the elastic blades 27 and consequently the amplitude of the rotation of the rake 21 and of the balance wheel 10. More precisely, the two pins 30 of this regulating element 29 can be moved, which makes it possible to regulate, within a certain margin, the distance between the elastic blade 27 and the axis of rotation 24 of the rake. This allows fine regulating of the rate of the watch. This fine regulating of the rate of the watch can also be done through a screw balance wheel, as represented in the various figures, or with inertia-block balance wheels.

Figure 7:
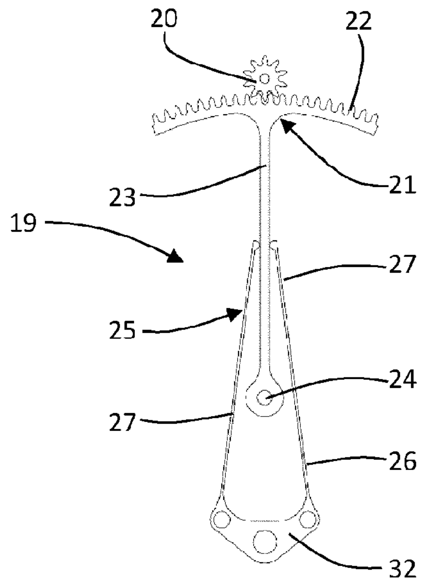
FIG. 7 is a top view of a variant of the return member of the invention, in a rest position.
Figure 8:
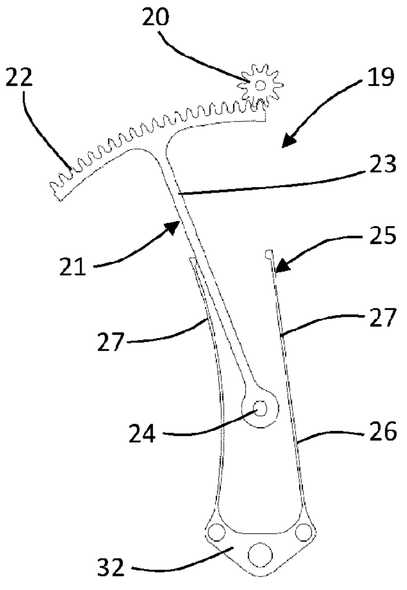
FIG. 8 is a top view of the return member of FIG. 7, in a working position.

In the embodiment illustrated by FIGS. 7 and 8, the return mechanism 25 is separated from the rake 21 and is not integral with the latter. In this realisation, the rake 21 pivots on its axis of rotation 24 and comprises a single arm 23 connecting the toothed sector 22 of the rake to its axis of rotation 24.

The return mechanism 25 also comprises two elastic blades 27, these blades being produced independently of the rake 21. These elastic blades are integral with a support 32 fixed to a plate of the timepiece movement. Each of the elastic blades 27 works together with one side of the arm 23 of the rake. When moving the rake in one direction, one of the elastic blades 27 leans against the corresponding side of the rake arm and deforms. This has the effect of allowing this elastic blade to store energy. The other elastic blade does not interact with the rake 21 so that only the stiffness of one blade intervenes and not of both.

At the end of the motion of the rake 21, the elastic blade 27 returns energy and pushes the rake in the opposite direction, as it has been explained above. The areas of contact between the elastic blades 27 and the arm 23 of the rake can be polished so as to minimize friction. The rake 21 and the elastic blades 27 being arranged in the same plane, these elastic blades do not undergo torsion, but only a bending which makes it possible to store and to return energy.

Figure 9:
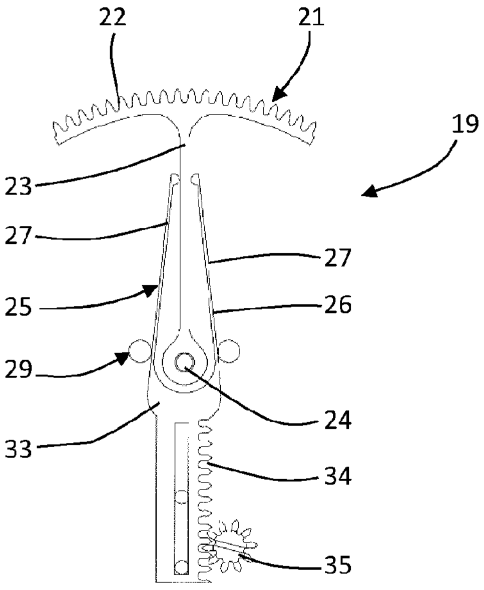
FIG. 9 illustrates a return member similar to the one of FIG. 6, in which an adjustment of the position of the elastic blades can be performed.

In the embodiment of FIG. 9, the elastic blades 27 are arranged on a movable support 33 whose position can be adjusted on the plate of the watch movement. This adjustment is possible by the fact that this mobile support 33 comprises a toothed bar 34 and the plate comprises a regulating pinion 35. The rotation of the regulating pinion 35 has the effect of moving the toothed bar 34 and thus the position of the elastic blades 27. This makes it possible to modify the distance between the axis of rotation 24 of the rake and the points of contact between the elastic blades 27 and the arm 23 of the rake. This modifies accordingly the force required to move the rake 21, which corresponds to an adjustment of the stiffness or of the visible stiffness of the elastic blades 27.

Figure 10:
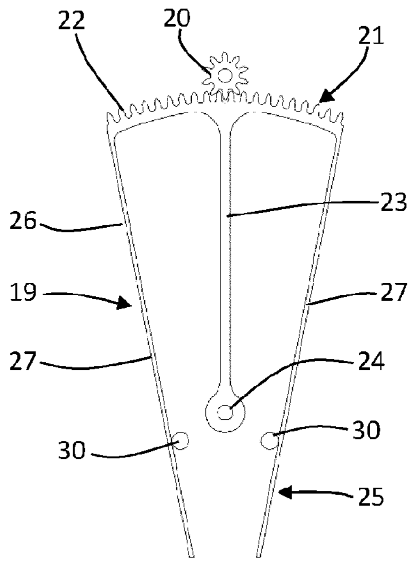
FIG. 10 represents a variant of the return member according to the invention, in a rest position.
Figure 11:
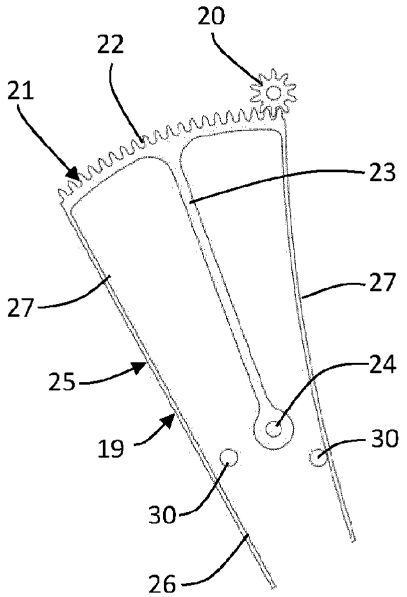
FIG. 11 is a view of the return member of FIG. 10, in a working position.
Figure 12:
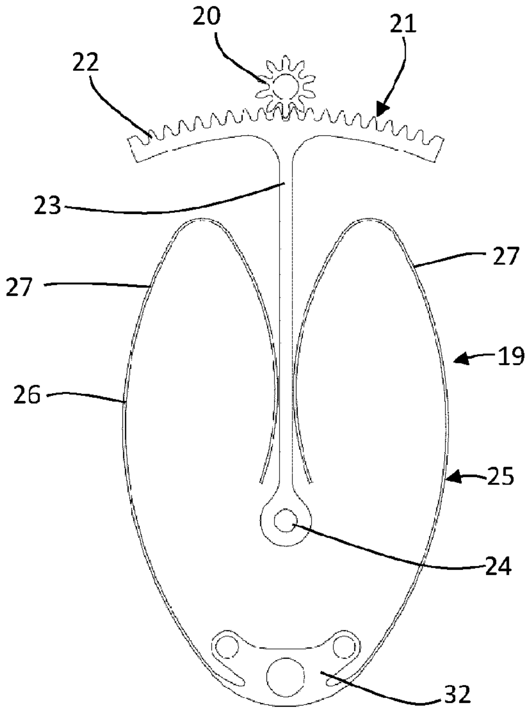
FIGS. 12 to 14 illustrate other variants of return members according to the invention, in rest position.
Figure 13:
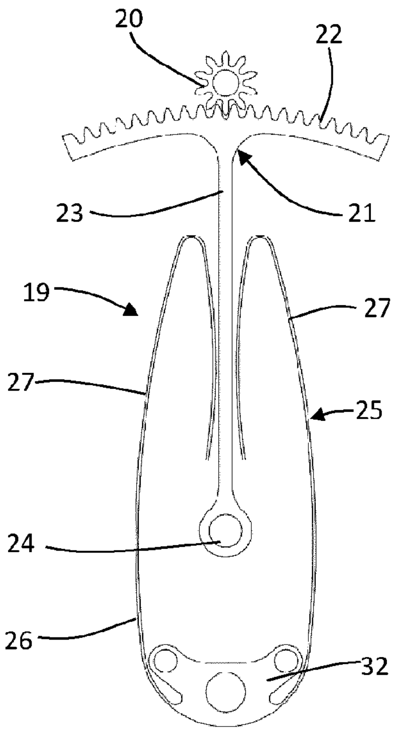

FIGS. 10 and 11 illustrate a variant of the return member 19 according to the invention, in which the rake 21, the arm 23 of the rake and the elastic blades 27 of the return mechanism are made in one piece. In this embodiment, as in the one described with reference to FIGS. 4 to 6, the timepiece comprises two pins 30 arranged so that the elastic blades 27 can lean against them and be deformed so as to store and return energy.

In this embodiment, the elastic blades 27 slide along the pins 30 and are not integral with them. There is thus a deformation in the form of bending of one blade at a time. There is neither simultaneous deformation of the two elastic blades, nor buckling, which would make the stiffness of the blades too great for real operation of the movement.

FIG. 10 illustrates the rake 21 in rest position and FIG. 11 illustrates the latter in working position. As can be seen in particular on FIG. 11, only one blade at a time works to store and return energy. Indeed, only the elastic blade interacting with the pin 30 is active. The other elastic blade 27, represented on the left on FIG. 11, does not interact with the corresponding pin 30 and therefore does not participate in the accumulation or in the return of energy, in this phase of the motion of the rake.

In the embodiments illustrated by FIGS. 12 to 15, the rake 21 is similar to the one of FIGS. 7 to 9. The elastic blades 27 of the return mechanism 25 are not rectilinear rods at rest, and form curves. An end zone of each of the elastic blades 27 leans against one side of the arm 23 of the rake 21 and operates according to the same principle as what has been explained with reference to FIGS. 7 to 9.

This realisation has the advantage of making it possible to increase the length of the elastic blades 27 and thus consequently to reduce their stiffness, however without the need to increase the size of the timepiece in which this return member will be housed. The blades illustrated by FIGS. 12 and 13 differ in their width and in the position of the contact between the elastic blades and the rake arm. The choice of the specific shape of the blades depends in particular on the space available in the movement.

Figure 14:
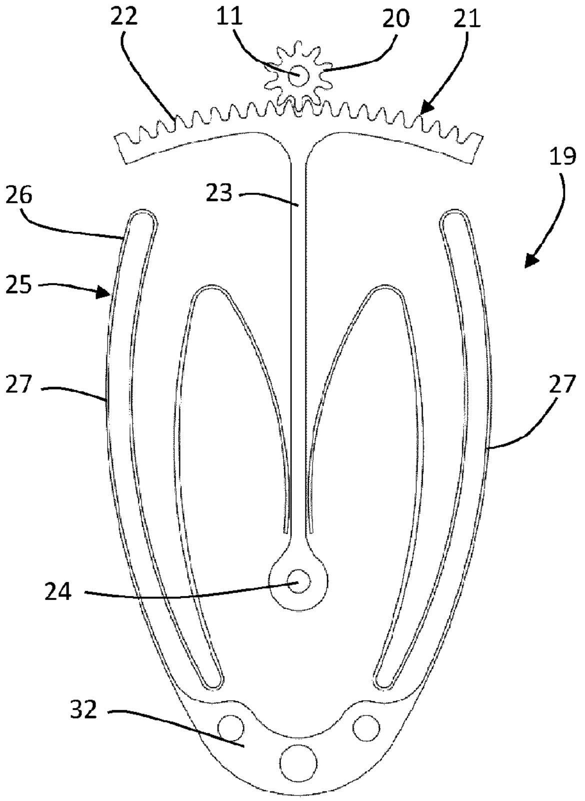
Figure 15:
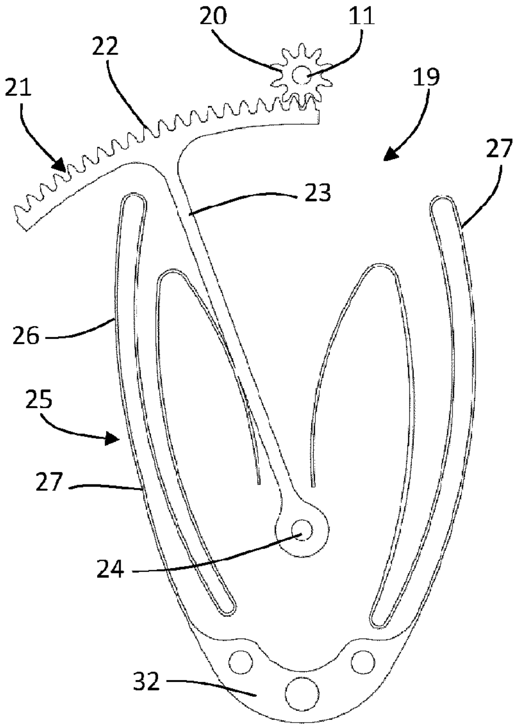
FIG. 15 represents the return member of FIG. 14, in working position.

In the embodiment illustrated by FIGS. 14 and 15, the elastic blades 27 form folds in the form of bellows. This embodiment is of interest because it makes it possible to produce blades of great length, without requiring a significant available space in the timepiece case. In this respect, it approaches the length of the spiral springs, without however having the relative disadvantages.

The embodiments of FIGS. 12 to 15 are also of interest because the position of the point of contact between the active spring blade 27 and the arm 23 of the rake moves with the motion of the rake 21. As can be seen in particular by comparing FIGS. 14 and 15, which respectively represent the rake 21 in rest position and in working position, when the rake 21 is in rest position or close to this position, the point of contact between one of the elastic blades 27 and the arm 23 of the rake is very close to the axis of rotation 24 of the rake. Therefore, the elastic blade 27 offers very little resistance to the rake 21, which allows a simple start of the movement, without risk of blocking. When the rake 21 pivots, as illustrated by FIG. 15, the shape of the elastic blades means that the point of contact between the active elastic blade 27 and the rake 21 moves in the direction of the toothed sector 22, opposite to the axis of rotation 24 of the rake. The force opposed by the elastic blade to the rake increases, which increases the energy that the elastic blade is able to store. In this way, the energy of the return mechanism 25 is not linear relative to the motion of the rake 21, and it is very weak when the rake 21 is close to its rest position. This allows not only an easy start of the movement, but also an optimal accumulation and return of energy.

Figure 16:
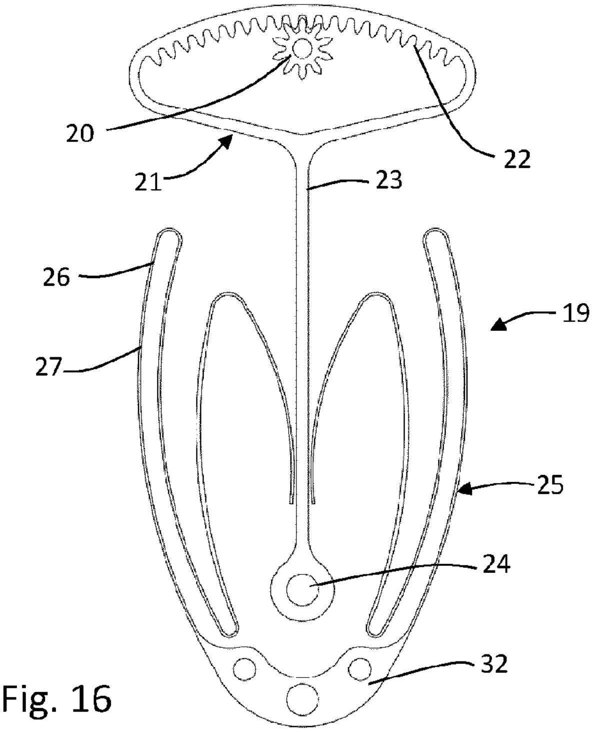
FIG. 16 represents a return member with an internally toothed rake and a return mechanism identical to the one of FIGS. 14 and 15.

In the embodiment of FIG. 16, the rake 21 comprises internal teeth. The return mechanism 25 is identical to the one of FIGS. 14 and 15. This is of interest because one part of the rake is located on the other side of the balance wheel shaft 11 relative to the axis of rotation 24 of the rake. This allows to save space which can be useful in a small watch case and/or if the space dedicated to the escapement is limited.

Figure 7A:
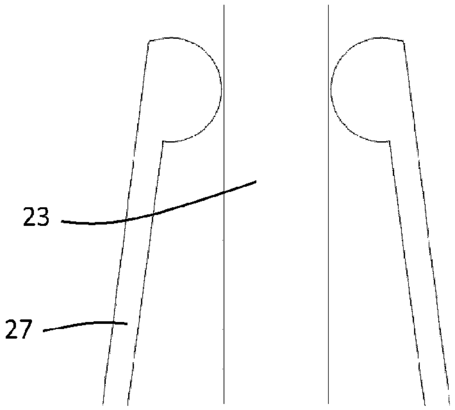
FIG. 7*a* is an enlarged view of a part of FIG. 7.

To allow the movement to start during raising and to avoid stop problems on the rest plane, it is judicious not to apply stress or weak stress on the arm 23 of the rake 21 when the latter is in its rest position, at dead centre. This can be done in several ways. According to one of the ways, the shape of the elastic blades 27 themselves is provided for this purpose, as has been explained with reference to FIGS. 14 and 15. According to another variant, for example illustrated by FIGS. 7 and 8, a slight clearance could be provided between the elastic blades 27 and the arm 23 of the rake when this rake is at dead centre. This clearance is visible in particular on FIG. 7*a*, which represents in a very enlarged way the zone of contact between the elastic blades 27 and the arm 23 of the rake as illustrated by FIG. 7. In this way, no force is applied to the rake by the return mechanism 25 when this rake is at dead centre. A force begins to be applied to the rake when it has begun to move.

According to another way, the timepiece movement comprises a regulating element 29, such as the eccentric pins 30 illustrated in FIGS. 5 and 6, making it possible to position the elastic blades 27 in a suitable position, which can be regulated and modified if necessary.

According to a preferred embodiment, stress may begin to be applied to the arm 23 of the rake 21 when the balance wheel 10 is pivoted by approximately 10°. Such a rotation allows to place one of the pallets of the lever on the impulse plane of one of the escapement teeth, which avoids blocking of the movement and allows it to start.

The rake 21 has been represented as comprising two arms 23 in FIGS. 4 to 6 and a single arm in the other figures. Particular shapes of elastic blades have been represented for each embodiment. Combinations of the different embodiments are also possible. For example it is possible to use elastic blades as illustrated by FIGS. 12 to 16, with a two-arm toothed rake as illustrated by FIGS. 4 and 6.

Likewise, regulating elements such as eccentrics or a mobile support can be added to the various embodiments illustrated.

The invention claimed is:

1. A clockwork movement escapement, comprising:
- a balance wheel pivoting on an axis of rotation of the balance wheel;
- an escape wheel;
- a lever; and
- a return member of the balance wheel, wherein the balance wheel is integral with a balance wheel pinion, the return member of the balance wheel includes
  - a rake provided with a toothed sector arranged to work together with the balance wheel pinion, the rake comprising an axis allowing its rotation between two extreme positions separated by a rest position,
  - a return mechanism comprising two springs arranged to press the rake towards its rest position, the springs comprising elastic blades arranged to store energy and to return energy to the rake and
  - only one of the elastic blades stores and returns energy at the same time.

2. The clockwork movement escapement according to claim 1, wherein when the rake is in its rest position, the springs are arranged symmetrically relative to a plane passing through the axis of rotation of the balance wheel and the axis of rotation of the rake.

3. A return member for a timepiece movement, comprising:
- an escapement provided with a balance wheel, with an escape wheel and with a lever, the return member includes
- a rake provided with a toothed sector arranged to work together with a balance wheel pinion, the rake having an axis allowing it to rotate between two extreme positions, called working positions, separated by a rest position;
- two springs arranged to press the rake towards its rest position, the springs comprising elastic blades arranged to store energy and to return energy to the rake, wherein
- only one of the elastic blades stores and returns energy at the same time.

4. The return member according to claim 3, wherein when the rake is in its rest position, the springs are arranged symmetrically relative to a plane passing through an axis of rotation of the balance wheel and through the axis of rotation of the rake.

5. The return member according to claim 3, wherein the rake includes internal teeth.

6. The return member according to claim 3, wherein the elastic blades are integral with the toothed sector.

7. The return member according to claim 3, wherein the elastic blades are arranged to lean against an arm of the rake.

8. A timepiece movement, comprising:
- an escapement provided with a balance wheel, an escape wheel, a lever and a return member for the balance wheel, wherein
- the balance wheel is integral with a balance wheel pinion;
- the return member of the balance wheel includes
  - a rake provided with a toothed sector arranged to work together with the balance wheel pinion, the rake comprising an axis allowing it to rotate between two extreme positions separated by a rest position; and
  - a return mechanism having two springs arranged to press the rake towards its rest position, the springs comprising elastic blades arranged to store energy and to return energy to the rake; and
  - only one of the elastic blades stores and returns energy at the same time.

9. The timepiece movement according to claim 8, wherein the movement includes at least two pins with which said elastic blades interact alternately during the motion of the rake around its axis of rotation.

10. The timepiece movement according to claim 8, further comprising a regulating element of the escapement.

11. The timepiece movement according to claim 10, wherein the regulating element of the escapement includes at least two pins movable on a plate of the movement and interacting with said springs.

12. A timepiece, comprising:
- a movement including
  - an escapement provided with a balance wheel, an escape wheel, a lever and a return member for the balance wheel, wherein
  - the balance wheel is integral with a balance wheel pinion;
- the return member of the balance wheel includes
  - a rake provided with a toothed sector arranged to work together with the balance wheel pinion, the rake comprising an axis allowing it to rotate between two extreme positions separated by a rest position; and
  - a return mechanism having two springs arranged to press the rake towards its rest position, the springs comprising elastic blades arranged to store energy and to return energy to the rake; and
  - only one of the elastic blades stores and returns energy at the same time.

13. The timepiece according to claim 12, wherein the movement further includes at least two pins with which said elastic blades interact alternately during the motion of the rake around its axis of rotation.

14. The timepiece according to claim 12, wherein the movement further includes a regulating element of the escapement.

15. The timepiece according to claim 14, wherein the regulating element of the escapement includes at least two pins movable on a plate of the movement and interacting with said springs.

* * * * *